(12) United States Patent
Kwon et al.

(10) Patent No.: US 9,055,645 B2
(45) Date of Patent: Jun. 9, 2015

(54) APPARATUS FOR CONTROLLING LIGHT EMITTING DEVICES

(71) Applicant: LG INNOTEK CO., LTD., Seoul (KR)

(72) Inventors: Ki Soo Kwon, Seoul (KR); Min Hak Kim, Seoul (KR); Il Yeong Kang, Seoul (KR); Keun Tak Joo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/068,125

(22) Filed: Oct. 31, 2013

(65) Prior Publication Data

US 2014/0125238 A1    May 8, 2014

(30) Foreign Application Priority Data

Nov. 2, 2012   (KR) .................. 10-2012-0123758

(51) Int. Cl.
*H05B 33/08*       (2006.01)
(52) U.S. Cl.
CPC .......... *H05B 33/0845* (2013.01); *H05B 33/083* (2013.01); *H05B 33/0809* (2013.01)

(58) Field of Classification Search
USPC .............. 315/185 R, 191, 192, 224, 307, 308
See application file for complete search history.

(56) References Cited

U.S. PATENT DOCUMENTS

| 7,081,722 | B1 | 7/2006 | Huynh et al. | 315/323 |
|---|---|---|---|---|
| 8,841,862 | B2 * | 9/2014 | Lee | 315/306 |
| 2011/0084619 | A1 | 4/2011 | Gray et al. | 315/185 |
| 2012/0038615 | A1 | 2/2012 | Leung et al. | 345/212 |
| 2014/0159608 | A1 * | 6/2014 | Simi et al. | 315/205 |

OTHER PUBLICATIONS

European Search Report dated Mar. 13, 2014 issued in Application No. 13 19 1097.8.

* cited by examiner

*Primary Examiner* — David H Vu
(74) *Attorney, Agent, or Firm* — Ked & Associates, LLP

(57) ABSTRACT

A light emitting unit includes a plurality of light emitting devices. A control apparatus includes a rectifier for converting an alternating current (AC) signal into a ripple signal by rectifying the AC signal. A ripple signal adjuster reduces a level difference between maximum and minimum levels of the ripple signal, and outputs the resultant ripple signal as a drive signal. A turning-on controller controls turning-on of the light emitting devices in accordance with a level variation of the drive signal.

20 Claims, 5 Drawing Sheets

APPARATUS FOR CONTROLLING LIGHT EMITTING DEVICES

CROSS REFERENCE TO RELATED APPLICATION

This application claims priority under 35 U.S.C. §119 to Korean Application No. 10-2012-0123758, filed in Korea on Nov. 2, 2012 which is hereby incorporated in its entirety by reference as if fully set forth herein.

BACKGROUND

1. Field

Embodiments relate to an apparatus for controlling light emitting devices.

2. Background

In accordance with development of semiconductor technologies, efficiency of light emitting diodes (LEDs) has been greatly enhanced. Thus, LEDs have advantages of being economical and environmentally friendly because lifespan is long and energy consumption is small, as compared to existing lighting devices such as incandescent lamps or fluorescent lamps. By virtue of such advantages, LEDs are highlighted as a substitute light source for a backlight of a flat display device such as a liquid crystal display (LCD) or a signal lamp.

Generally, when LEDs are used as a lighting device, plural LEDs are connected in series or in parallel, and turning-on/off thereof is controlled by a light emitting device control apparatus. Generally, such a light emitting device control apparatus, which controls plural LEDs, rectifies alternating current (AC) voltage into ripple voltage, and controls turning-on/off of the plural LEDs, using the rectified ripple voltage.

FIG. 1 is a waveform diagram of ripple voltage generated through full-wave rectification of AC voltage in a conventional light emitting device control apparatus. In FIG. 1, "V" represents voltage, and "I" represents current.

The conventional light emitting device control apparatus full-wave rectifies AC voltage, to convert the AC voltage into ripple voltage as shown in FIG. 1. Using the ripple voltage, the light emitting device control apparatus controls turning-on/off of light emitting devices such as LEDs. Referring to the waveform of FIG. 1, the LEDs repeat turning-on and turning-off in accordance with characteristics of ripple voltage. That is, current having a predetermined pattern is continuously supplied to turn on the LEDs in a section in which the ripple voltage has a level equal to or higher than a predetermined level, in each period. However, in a section 10 in which the ripple voltage has a level lower than the predetermined level, no current is supplied to turn off the LEDs, in each period.

In the conventional light emitting device control apparatus, however, flicker inevitably occurs in the section 10 because turning-on and turning-off are controlled at intervals of very short time. Although it may be difficult to recognize flicker by human eyes, there may be a problem in that, when the eyes of the user are exposed to flicker for a long time, the user may become sensitive and may easily feel fatigued.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Hereinafter, embodiments will be described in detail with reference to the annexed drawings for better understanding. However, it will be apparent that the embodiments may be modified in various ways and the scope of the embodiments should not be construed as being limited to the following description. Thus, the embodiments are provided to ensure better comprehension of the embodiments by one of ordinary skill in the art.

Figure 2:
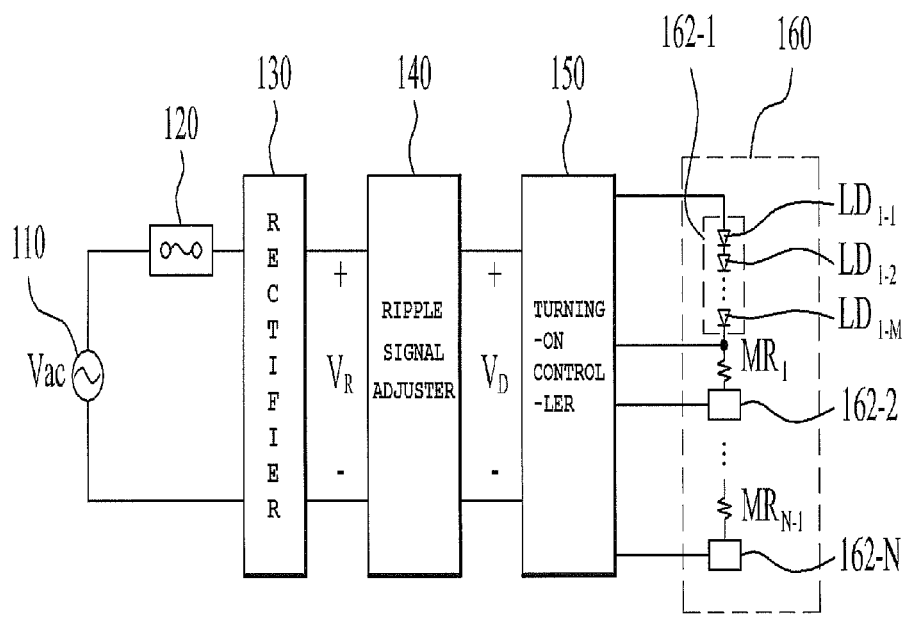
FIG. 2 is a block diagram schematically illustrating an apparatus for controlling a light emitting device in accordance with an embodiment.

FIG. 2 is a block diagram schematically illustrating an apparatus for controlling a light emitting device in accordance with an embodiment. The light emitting device control apparatus includes an alternating current (AC) power source 110, a fuse 120, a rectifier 130, a ripple signal adjuster 140, and a turning-op controller 150.

Figure 3:
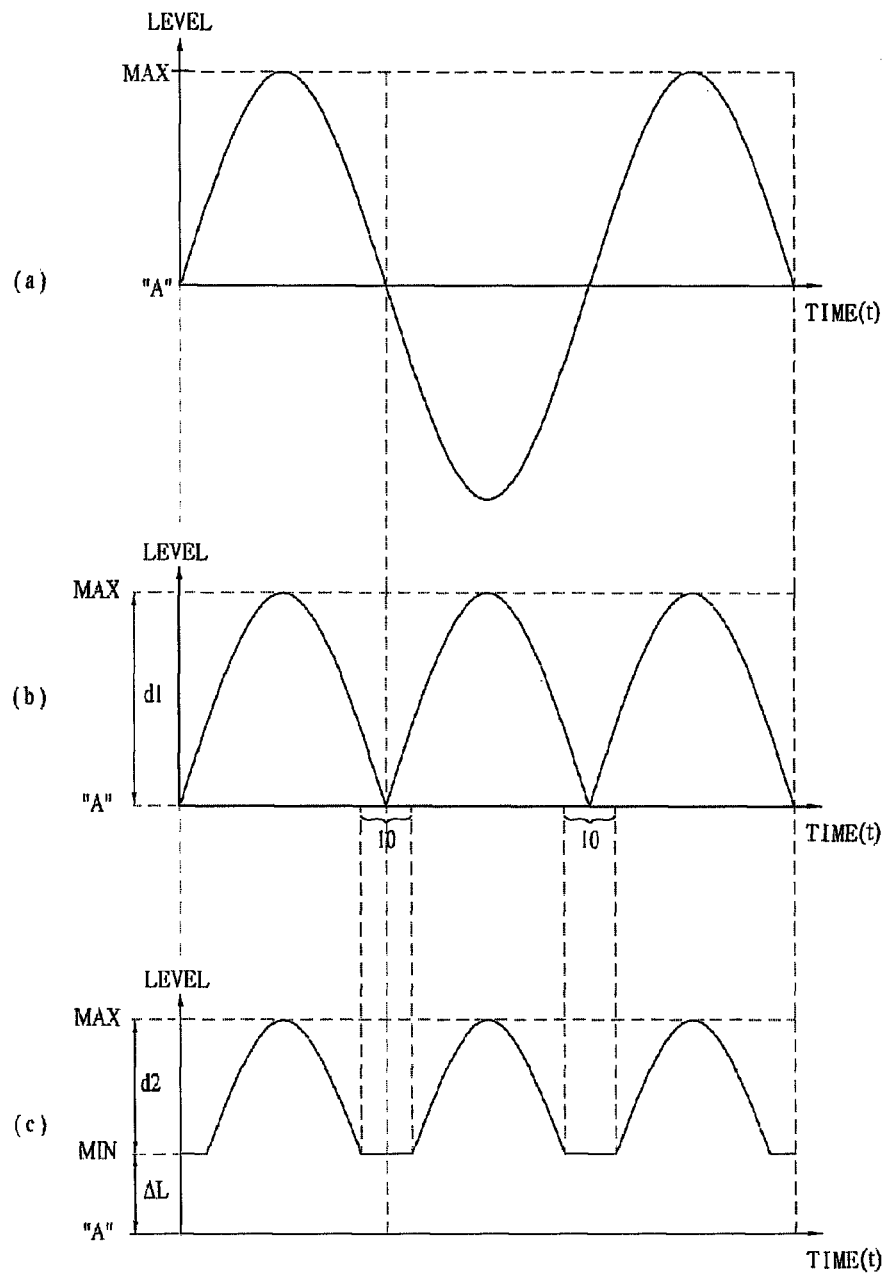
FIGS. 3(a) to 3(c) are waveform diagrams of constituent units of the light emitting device control apparatus illustrated in FIG. 2, respectively.

FIGS. 3(a) to 3(c) are waveform diagrams of constituent units of the light emitting device control apparatus illustrated in FIG. 2, respectively.

The AC power source 110 supplies an AC signal as exemplarily illustrated in FIG. 3(a). In this case, the AC signal may be an AC voltage Vac having an effective value of 100 V or 200 V and a frequency of 50 Hz to 60 Hz.

The fuse 120 functions to protect the light emitting device control apparatus of FIG. 2 from an AC signal momentarily exhibiting an excessive level. That is, when an AC signal momentarily exhibiting an excessive level is input to the light emitting device control apparatus, the fuse 120 is opened, thereby protecting the constituent units 130 to 150 of the light emitting device control apparatus. To this end, the fuse 120 may be arranged between the AC power source 110 and the rectifier 130.

The rectifier 130 rectifies an AC signal supplied from the AC power source 110, and outputs, as a ripple signal VR, the rectified result to the ripple signal adjuster 140. For example, the rectifier 130 may full-wave rectify the AC signal of FIG. 3(a), as exemplarily illustrated in FIG. 3(b). That is, the ripple signal VR may have a waveform as exemplarily illustrated in FIG. 3(b).

The ripple signal adjuster 140 reduces the difference between maximum and minimum levels of the ripple signal VR, and outputs the resultant signal as a drive signal VD. For example, the ripple signal adjuster 140 reduces, by a predetermined level ΔL, a level difference d1 between maximum level MAX and minimum level "A" of the ripple signal VR illustrated in FIG. 3(b), as illustrated in FIG. 3(c), and outputs the resultant signal to the turning-on controller 150, as the drive signal VD. Here, the minimum level "A" may be a median value of peak-to-peak value of the AC signal shown in FIG. 3(a). Otherwise, the minimum level "A" may be an average value of the maximum and minimum values of the AC signal. "A" may be a real number, for example, '0.' Thus, the drive signal VD has a level difference d2 as expressed in the following Expression 1:

$$d2 = d1 - \Delta L \quad \text{[Expression 1]}$$

For example, the predetermined level ΔL may be 40% to 50% of the full level d1.

The turning-on controller 150 controls turning-on of plural light emitting devices included in a light emitting unit 160 in accordance with a variation in the level of the drive signal VD received from the ripple signal adjuster 140. In conventional cases in which the ripple signal illustrated in FIG. 3(b) is used as a drive signal VD, turning-on/off of plural light emitting devices connected in series is controlled in accordance with a variation in the level of the drive signal VD. For this reason, flicker may occur in a section 10.

On the other hand, in the present embodiment, the turning-on controller 150 controls turning-on of the plural light emitting devices connected in series, in accordance with a variation in the level of the drive signal VD illustrated in FIG. 3(c), instead of FIG. 3(b). Accordingly, flicker may be removed or reduced in the section 10.

Meanwhile, as described above, the light emitting unit 160 may include the plural light emitting devices, which are connected in series, and are controlled by the turning-on controller 150, to be turned on or off. For example, the light emitting unit 160 may include first to N-th light emitting device arrays 162-1, 162-2, and 162-N, and first to (N−1)th connecting resistors MR1, MR2, and MRN-1. Of course, the light emitting unit 160 is not limited to such an arrangement. Here, N may be an integer of 2 or greater. The plural light emitting devices, which are included in the light emitting unit 160 and are connected in series, may be grouped into a plurality of light emitting device arrays 162-1, 162-2, and 162-N. If each of the light emitting device arrays 162-1, 162-2, and 162-N includes first to M-th light emitting devices LDn-1, LDn-2, and LDn-M connected in series, the series-connected N*M light emitting devices included in the light emitting unit 160 may be grouped into N light emitting device arrays 162-1, 162-2, and 162-N. Here, M is an integer of 1 or greater, and "n" satisfies an inequality of 1≤n≤N.

Figure 4:
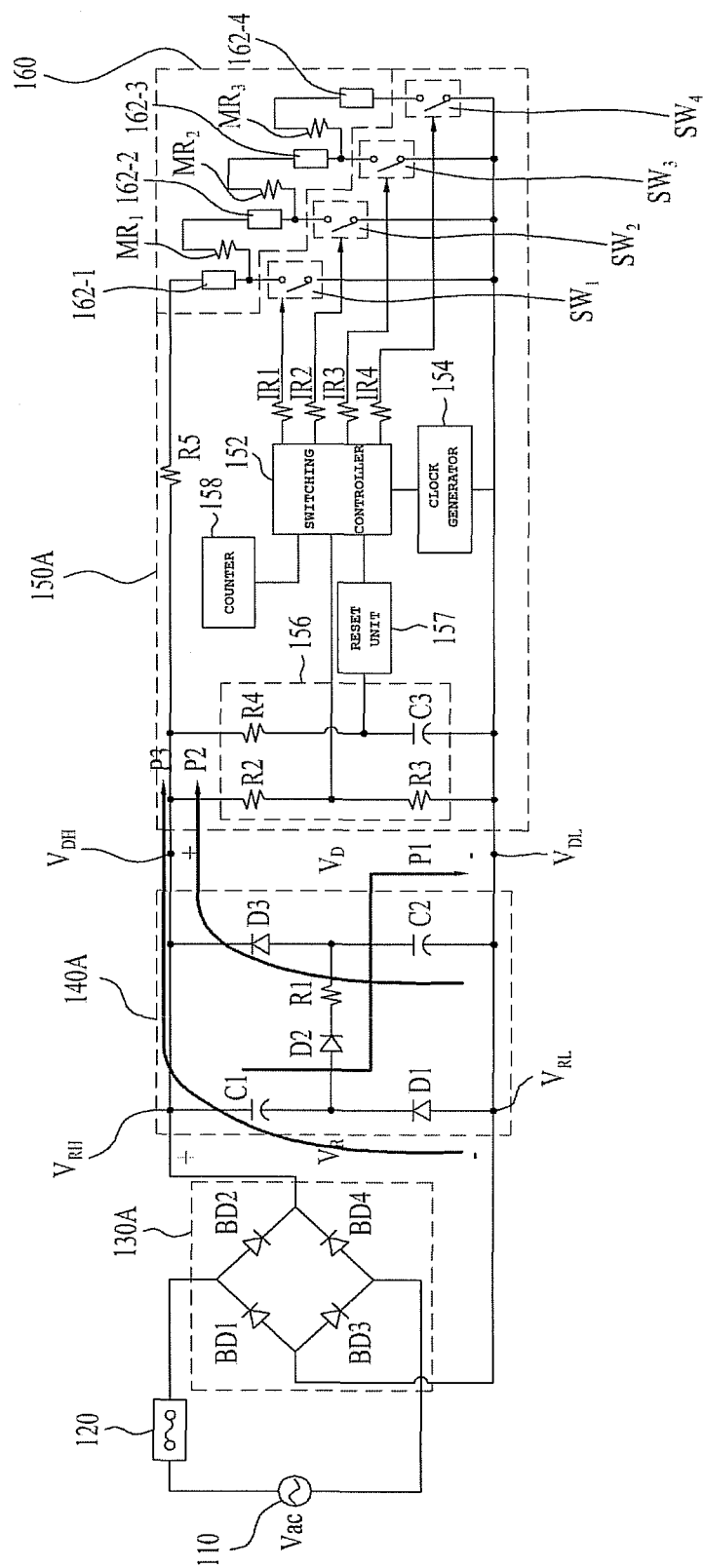
FIG. 4 is a circuit diagram of embodiments of the constituent units illustrated in FIG. 2.

FIG. 4 is a circuit diagram of embodiments of the constituent units 130 to 150 illustrated in FIG. 2.

The light emitting device control apparatus of FIG. 4 includes the AC power source 110, the fuse 120, a rectifier 130A, a ripple signal adjuster 140A, and a turning-on controller 150A. The rectifier 130A, ripple signal adjuster 140A, and turning-on controller 150A of FIG. 4 correspond to respective embodiments of the rectifier 130, ripple signal adjuster 140, and turning-on controller 150 of FIG. 2.

The rectifier 130A of FIG. 4 may be implemented by a full-wave diode bridge circuit which rectifies an AC signal Vac, to convert the AC signal Vac into a ripple signal VR. The full-wave diode bridge circuit may include four bridge diodes BD1, BD2, BD3, and BD4. The full-wave diode bridge circuit is known and, as such, no detailed description thereof will be given.

In accordance with an embodiment, the ripple signal adjuster 140A may reduce the level difference between maximum level MAX and minimum level "A" of the ripple signal VR by increasing the minimum level "A" of the ripple signal VR, using a signal charging/discharging unit. The signal charging/discharging unit charges the ripple signal VR supplied from the rectifier 130, and discharges the charged signal when the level of the ripple signal VR is equal to or lower than a predetermined level.

To this end, as illustrated in FIG. 4, the ripple signal adjuster 140A may include first and second capacitors C1 and C2, first, second, and third diodes D1, D2, and D3, and a charging path resistor R1.

The first diode D1 has an anode connected to a low potential VRL of the ripple signal VR. The first capacitor C1 is connected between a high potential VRH of the ripple signal VR and a cathode of the first diode D1. The second diode D2 has an anode connected to the cathode of the first diode D1, and a cathode connected to one side of the charging path resistor R1. The charging path resistor R1 is connected, at one side thereof, to the cathode of the second diode D2 while being connected, at the other side thereof, to an anode of the third diode D3. The anode of the third diode D3 is connected to the other side of the charging path resistor R1. The third diode D3 also has a cathode connected to the high potential VRH of the ripple signal VR. The second capacitor C2 is connected between the other side of the charging path resistor R1 and the low potential VRL of the ripple signal VR.

The ripple signal adjuster 140A illustrated in FIG. 4 has a configuration having the form of a valley-fill circuit.

In the ripple signal adjuster 140A, which has the above-described configuration, the ripple signal VR supplied from the rectifier 130A is charged in the first and second capacitors C1 and C2 via a charging path P1, up to a substantially middle level of the ripple signal VR. When the level of the ripple signal VR is lowered to a valley phase below a peak value, the level of the drive signal VD is lowered to substantially half the level of the ripple signal VR. In this case, voltages charged in the capacitors C1 and C2 are discharged, as drive signals, into the turning-on controller 150A via discharging paths P2 and P3, respectively. The turning-on controller 150A increases the number of turned-on ones of the light emitting devices LD1-1, and LDN-M in accordance with an increase in the level of the drive signal VD in a phase range within which the level of the drive signal VD increases from a low level to a high level. On the other hand, in a phase range within which the level of the drive signal VD decreases from a high level to a low level, the turning-on controller 150A decreases the number of turned-on ones of the light emitting devices LD1-1, and LDN-M in accordance with the decrease in the level of the drive signal VD.

To this end, as illustrated in FIG. 4, the turning-on controller 150A includes first to N-th switches SW1, SW2, and SWN, a switching controller 152, a voltage adjuster 156, a clock generator 154, a reset unit 157, a counter 158, first to N-th current limiting resistors IR1, IR2, and IRN. The turning-on controller 150A of FIG. 4 is illustrative and, as such, may have various circuit configurations, so long as the turning-on controller 150A may control turning-on and turning-off of the light emitting unit 160 in accordance with variation in the level of the drive voltage, as described above.

Each of the first to (N−1)th switches SW1, SW2, and SWN-1 is arranged between a reference potential and a node between the associated connecting resistors and the associated light, emitting device array. The N-th switch SWN is arranged between the reference potential and the N-th light emitting array. If N is 4 (N=4), as illustrated in FIG. 4, the first switch SW1 is arranged between the reference potential and a node between the first connecting resistor MR1 and the first light emitting device array 162-1. In this case, the second switch SW2 is arranged between the reference potential and a node between the second connecting resistor MR2 and the second light emitting device array 162-2. The third switch SW3 is arranged between the reference potential and a node between the third connecting resistor MR3 and the third light emitting device array 162-3. The fourth switch SW4 is arranged between the reference potential and the fourth light emitting device array 162-4. To this end, each of the first to fourth switches SW1, SW2, SW3, and SW4 may be implemented by a bipolar transistor or a field effect transistor, etc. If each of the first to fourth switches SW1, SW2, SW3, and SW4 may be implemented by a bipolar transistor, the base of each bipolar transistor may be connected to an associated one of the current limiting resistors IR1, IR2, IR3, and IR4. On the other hand, each of the first to fourth switches SW1, SW2, SW3, and SW4 may be implemented by a field effect transistor, the gate of each field effect transistor may be connected to an associated one of the current limiting resistors IR1, IR2, IR3, and IR4.

The switching controller 152 controls opening or closing of the first to fourth switches SW1, SW2, SW3, and SW4 in accordance with the level of the drive signal VD.

Each of the first to fourth current limiting resistors IR1, IR2, IR3, and IR4 is arranged between the switching controller 152 and an associated one of the first to fourth switches SW1, SW2, SW3, and SW4. Another current limiting resistor R5 may be arranged between the voltage adjuster 156 and the light emitting unit 160. In the case in which N is 4 (N=4), as illustrated in FIG. 4, the first current limiting resistor IR1 is arranged between the switching controller 152 and the first switch SW1. In this case, the second current limiting resistor IR2 is arranged between the switching controller 152 and the second switch SW2. The third current limiting resistor IR3 is arranged between the switching controller 152 and the third switch SW3. The fourth current limiting resistor IR4 is arranged between the switching controller 152 and the fourth switch SW4.

The voltage adjuster 156 adjusts the level of the drive signal VD, and supplies the level-adjusted signal to the switching controller 152. To this end, the voltage adjuster 156 may include resistors R2, R3, and R4, and a third capacitor C3. Of course, embodiments are not limited to the above-described configuration. The resistors R2 and R3 are connected in series between high and low levels VDH and VDL of the drive signal VD. The resistor R4 and third capacitor C3 are connected in series between the high and low levels VDH and VDL of the drive signal VD.

In addition, the turning-on controller 150A may further include the clock generator 154 which supplies a clock signal to the switching controller 152. The clock generator 154 is connected between the low level VDL of the drive signal VD and the switching controller 152, to generate a clock signal. The clock generator 154 outputs the generated clock signal to the switching controller 152.

The turning-on controller 150A according to the above-described embodiment may further include the reset unit 157 which is arranged between the switching controller 152 and a node between the resistor R4 and the third capacitor C3. The reset unit 157 functions to reset operation of the switching controller 152 upon cutting-off of power or inputting of power.

The turning-on controller 150A may further include the counter 158. The counter 158 counts the number of clocks generated in the clock generator 154. For example, numbers of counted clocks are matched with instantaneous values of drive voltage, respectively, and the matched values are stored in a memory (not shown) included in the controller 152 in the form of a lookup table. When the instantaneous value of drive voltage detected by the resistors R2 and R3 of the voltage adjuster 156 corresponds to a minimum level MIN, the counter 158 may start a counting operation. Accordingly, the switching controller 152 may generate a signal to turn off a corresponding one of the first to N-th switches SW1, SW2, and SWN in accordance with the number of clocks counted by the counter 158.

Hereinafter, operation of the light emitting device control apparatus having the above-described configuration will be described with reference to the accompanying drawings in conjunction with an example in which N is 4 (N=4). Although it is assumed that the above-described ripple signal is ripple voltage, embodiments are not limited to this assumption.

Figure 5:
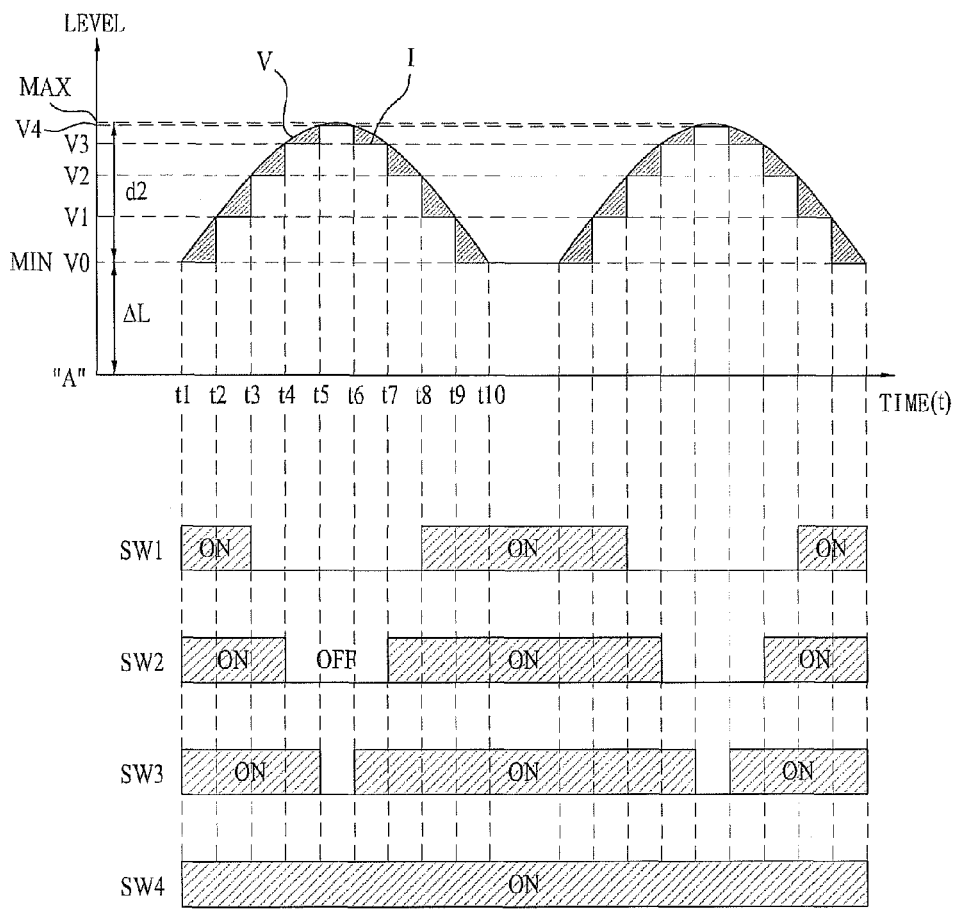
FIG. 5 shows waveform diagrams of drive voltage and drive current explaining operation of the light emitting device control apparatus illustrated in FIG. 4.

FIG. 5 shows waveform diagrams of drive voltage V and drive current I explaining operation of the light emitting device control apparatus illustrated in FIG. 4.

Referring to FIGS. 4 and 5, turning-on of the first to fourth light emitting device arrays 162-1 to 162-4 may be set in such a manner that: the first light emitting device array 162-1 is turned on when the drive voltage VD is equal to or higher than V1, but lower than V2; the first and second light emitting device arrays 162-1 and 162-2 are turned on when the drive voltage VD is equal to or higher than V2, and lower than V3; the first to third light emitting device arrays 162-1, 162-2, and 162-3 are turned on when the drive voltage VD is equal to or higher than V3, and lower than V4; and the first to fourth light emitting device arrays 162-1 to 162-4 are turned on when the drive voltage VD is equal to or higher than V4.

Thus, the switching controller 152 increases the number of turned-on light emitting device arrays in accordance with a variation in the level of the drive voltage VD in a phase range within which the level of the drive voltage VD increases from a low level to a high level. On the other hand, the switching controller 152 decreases the number of turned-on light emitting device arrays in accordance with a variation in the level of the drive voltage VD in a phase range within which the level of the drive voltage VD decreases from a high level to a low level.

Initially, in a state in which the switching controller 152 is reset by the reset unit 157, ripple voltage VR output from the rectifier 130A is applied to the ripple signal adjuster 140A. In this case, the ripple signal adjuster 140A increases the minimum level "A" of the ripple voltage VR from a level "A" by ΔL, and then outputs the resultant voltage to the turning-on controller 150A, as a drive voltage VD. In this reset period, the first to fourth light emitting device arrays 162-1 to 162-4 are in a turned-off state.

When the drive voltage VD subsequently reaches a driving initiation value, namely, V0 (time t1), the switching controller 152 of the turning-on controller 150A turns on all of the first to fourth switches SW1 to SW4.

When the drive voltage VD subsequently reaches "V1" (time t2), the first light emitting device array 162-1 is turned on. In this case, although all the first to fourth switches SW1 to SW4 are in a turned-on state, only the first light emitting device array 162-1 is turned on.

When the drive voltage VD subsequently reaches "V2" (time t3), the switching controller 152 turns off only the first switch SW1. Accordingly, the drive voltage VD is supplied to the first and second light emitting device arrays 162-1 and 162-2 and, as such, all the light emitting devices included in the first and second light emitting device arrays 162-1 and 162-2 are turned on. In this case, although the second to fourth switches SW2 to SW4 are in a turned-on state, only the first and second light emitting device arrays 162-1 and 162-2 is turned on.

When the drive voltage VD subsequently reaches "V3" (time t4), the switching controller 152 also turns off the second switch SW2. Accordingly, the drive voltage VD is supplied to the first to third light emitting device arrays 162-1 to 162-3 under the condition that the first and second switches SW1 and SW2 are in a turned-off state and, as such, all the light emitting devices included in the first to third light emitting device arrays 162-1 to 162-3 are turned on. In this case, although the third and fourth switches SW3 and SW4 are in a turned-on state, only the first to third light emitting device arrays 162-1 to 162-3 is turned on.

When the drive voltage VD subsequently reaches "V4" (time t5), the switching controller 152 also turns off the third switch SW3. Accordingly, the drive voltage VD is supplied to the first to fourth light emitting device arrays 162-1 to 162-4 under the condition that the first to third switches SW1 to SW3 are in a turned-off state, and only the fourth switch SW4 is turned on and, as such, all the light emitting devices included in the first to fourth light emitting device arrays 162-1 to 162-4 are turned on.

When the drive voltage VD is subsequently decreased to "V4" after reaching the maximum level MAX (time t6), the switching controller 152 turns on the third switch SW3. Since the level of the drive voltage VD is lower than "V4", the fourth light emitting device array 162-4 is turned off, and the first to third light emitting device arrays 162-1 to 162-3 are still in a turned-on state.

When the drive voltage VD subsequently reaches "V3" (time t7), the switching controller 152 turns on the second switch SW2. Since the level of the drive voltage VD is lower than "V3", the third and fourth light emitting device arrays 162-3 and 162-4 are turned off, and the first and second light emitting device arrays 162-1 and 162-2 are still in a turned-on state.

When the drive voltage VD subsequently reaches "V2" (time t8), the switching controller 152 turns on the first switch SW1. Since the level of the drive voltage VD is lower than "V2", the second to fourth light emitting device arrays 162-2 to 162-4 are turned off, and only the first light emitting device array 162-1 is in a turned-on state.

When the drive voltage VD subsequently reaches "V1" (time t9), the switching controller 152 maintains the turned-on state of the first to fourth switches SW1 to SW4. Since the level of the drive voltage VD is lower than "V1", all the first to fourth light emitting device arrays 162-1 to 162-4 are turned off. However, if the minimum level MIN of the drive voltage VD is sufficient to turn on the first light emitting device array 162-1, the first light emitting device array 162-1 may always be maintained in a turned-on state. Accordingly, the section 10 illustrated in FIG. 1, in which flicker is generated, is eliminated.

Generally, flicker index may be expressed by ripple factor expressed by the following Expression 2:

$$\text{ripple factor} = \frac{\text{MAX} - \text{MIN}}{\text{MAX} + \text{MIN}} \times 100 \quad \text{[Expression 2]}$$

Figure 1:
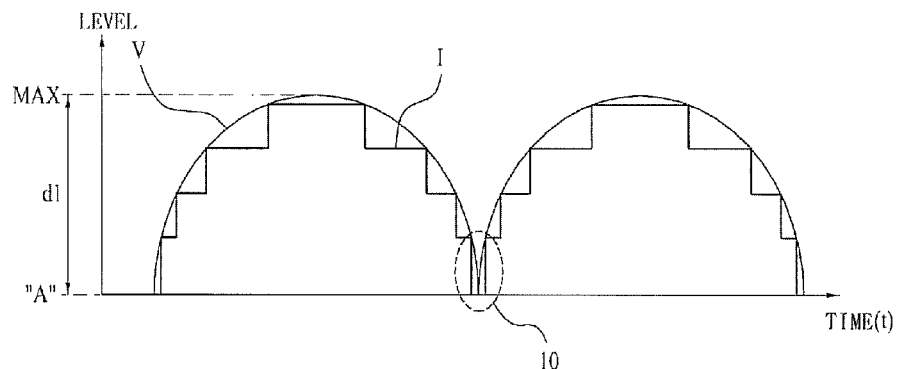
FIG. 1 a waveform diagram of ripple voltage generated through full-wave rectification of AC voltage in a conventional light emitting device control apparatus.

Referring to Expression 2, the level difference between maximum level MAX and minimum level "A" of ripple vice control apparatus is "d1", as illustrated in FIG. 1. On the other hand, the level difference between maximum and minimum levels MAX and MIN of drive voltage to control turning-on/off of the light emitting devices in the light emitting device control apparatus according to the present embodiment is "d2" decreased from "d1" by ΔL, as illustrated in FIG. 5 and Expression 1. Accordingly, it may be seen that the present embodiment exhibits reduced flicker, as compared to the conventional case.

Figure 6:
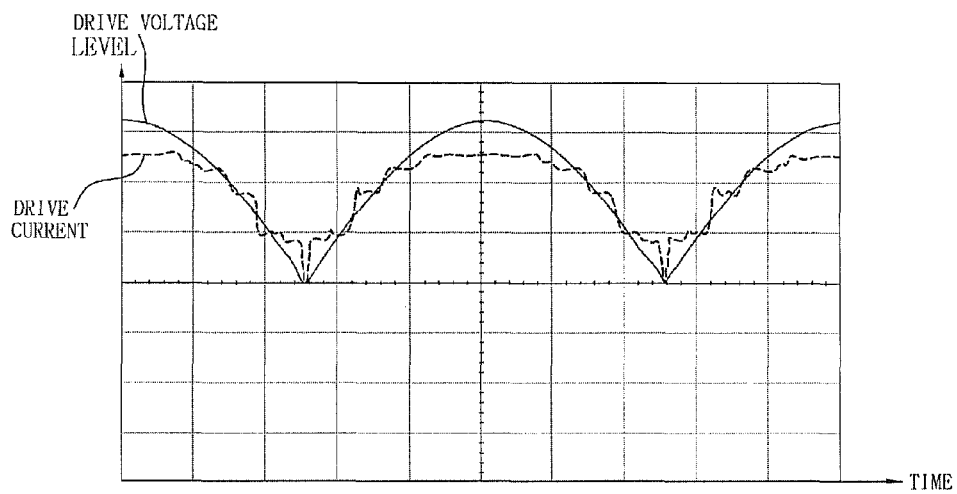
FIGS. 6 and 7 are graphs explaining power factor and total harmonic distortion in the conventional case and present embodiment.
Figure 7:
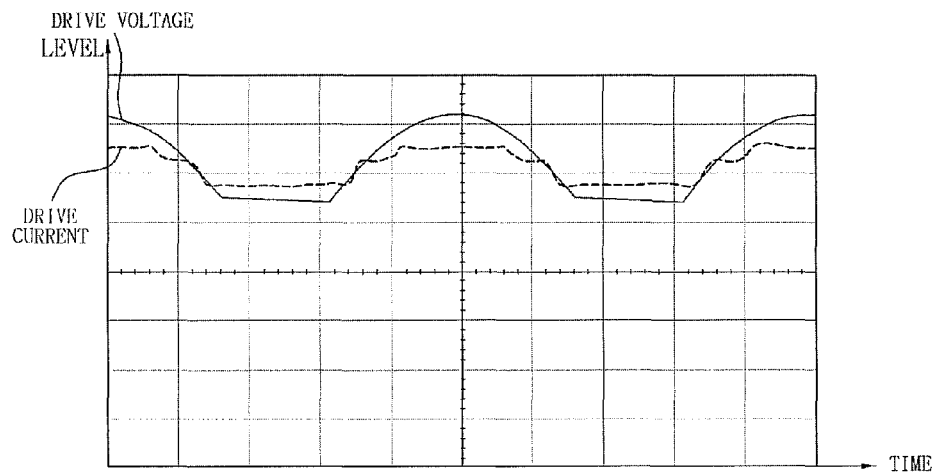

FIGS. 6 and 7 are graphs explaining power factor (PF) and total harmonic distortion (THD) in the conventional case and present embodiment. In each graph, the horizontal axis represents time, and the vertical axis represents levels of drive signals, namely, drive voltage and drive current.

Referring to FIG. 6, the conventional light emitting device control apparatus may exhibit power factor of 0.99, and THD of 11%. Generally, power factor may be decreased as ripple factor decreases. Accordingly, in the light emitting device control apparatus according to the embodiment, a reduction in power factor occurs inevitably because ripple factor is inevitably decreased in order to reduce flicker. That is, power factor in the present embodiment may be decreased, as compared to the conventional case.

In accordance with the present embodiment, however, when the level difference "MAX−MIN" of drive voltage is reduced by 40 to 50%, power factor is decreased from 0.99 to 0.96 by 0.03, and THD is increased from 11% to 22%, as illustrated in FIG. 7. When it is required that rated power factor for authentication of high efficiency is 0.9 or more, and rated THD for authentication of high efficiency is 30% or less, the light emitting device control apparatus according to the present embodiment sufficiently may satisfy the rated power factor and THD while reducing flicker.

As is apparent from the above description, the light emitting device control apparatus according to the present embodiment controls turning-on/off of light emitting devices by drive voltage obtained by increasing the minimum level of ripple voltage and, as such, the light emitting devices are maintained in a turned-on state even in a section in which ripple voltage is lower than a predetermined level, to reduce flicker.

Embodiments provide a light emitting device control apparatus capable of removing flicker.

In an embodiment, a light emitting device control apparatus for controlling a light emitting unit including a plurality of light emitting devices includes a rectifier for converting an alternating current (AC) signal into a ripple signal by rectifying the AC signal, a ripple signal adjuster for reducing a level difference between maximum and minimum levels of the ripple signal, and outputting the resultant ripple signal as a drive signal, and a turning-on controller for controlling turning-on of the light emitting devices in accordance with a level variation of the drive signal.

The ripple signal adjuster may reduce the level difference of the ripple signal by 40 to 50%, and outputs the resultant ripple signal as the drive signal. Alternatively, the ripple signal adjuster may increase the minimum level, to reduce the level difference.

The ripple signal adjuster may include a signal charging/discharging unit for charging the ripple signal, discharging the charged signal when the level of the ripple signal is equal to or lower than a predetermined level, and outputting the resultant signal as the drive signal having the reduced level difference.

The ripple signal adjuster may include a first diode having an anode connected to a low potential of the ripple signal, a first capacitor connected between a high potential of the ripple signal and a cathode of the first diode, a second diode having an anode connected to a cathode of the first diode, a charging path resistor having one side connected to a cathode of the second diode, a third diode having a cathode connected to the high potential of the ripple signal, and an anode connected to the other side of the charging path resistor, and a second capacitor connected between the other side of the charging path resistor and the low potential of the ripple signal.

The rectifier may include a full-wave diode bridge circuit for rectifying the AC signal, to convert the AC signal into the ripple signal.

The turning-on controller may increase the number of turned-on ones of the light emitting devices in accordance with an increase in the level of the drive signal in a phase range within which the level of the drive signal increases from a low level to a high level. The turning-on controller may decrease the number of turned-on ones of the light emitting devices in accordance with a decrease in the level of the drive signal in a phase range within which the level of the drive signal decreases from a high level to a low level.

The plurality of light emitting devices may be connected in series. The light emitting unit may include a plurality of light emitting device arrays, and connecting resistors each arranged between adjacent ones of the light emitting device arrays. The plural light emitting devices connected in series may be grouped into the plural light emitting device arrays.

The turning-on controller may include switches each arranged between a reference potential and a node between an associated one of the connecting resistor and an associated one of the light emitting arrays, and a switching controller for controlling opening and closing of the switches in accordance with a level of the drive signal.

The turning-on controller may further include current limiting resistors each arranged between the switching controller and an associated one of the switches, and a voltage adjuster for adjusting the level of the drive signal, and supplying the level-adjusted drive signal to the switching controller.

The voltage adjuster may include a plurality of first resistors connected in series between high and low potentials of the drive signal, and a second resistor and a third capacitor connected in series between the high and low potentials of the drive signal.

The turning-on controller may further include a reset unit connected between the switching controller and a node between the second resistor and the third capacitor, to reset operation of the switching controller upon cutting-off of supplying the AC signal or inputting of supplying the AC signal.

The turning-on controller may further include a clock generator for supplying a clock signal to the switching controller.

The turning-on controller may further include a counter for counting the number of clocks generated in the clock generator. The switching controller may control opening or closing of the switches in response to counted results from the counter.

The light emitting device control apparatus may further include a fuse arranged between the AC signal and the rectifier.

The turning-on controller may sequentially turn on or off the plural light emitting devices in accordance with the level variation of the drive signal.

The turning-on controller may control turning-on or turning-off of the plural light emitting devices according to the level variation of the drive signal on a per light emitting device array basis.

The turning-on controller may sequentially turn on or off the plural light emitting device arrays in accordance with the level variation of the drive signal.

In an embodiment, a light emitting device control apparatus for controlling a light emitting unit including a plurality of light emitting devices includes a rectifier for converting an alternating current (AC) voltage into a ripple voltage by rectifying the AC voltage, a ripple signal adjuster for increasing a minimum level of the ripple voltage, to reduce a level difference between maximum and minimum levels of the ripple voltage, thereby outputting a drive voltage having a reduced level difference, and a turning-on controller for controlling turning-on or turning-off of the light emitting devices in accordance with a level variation of the drive voltage.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light emitting device control apparatus for controlling a light emitting unit including a plurality of light emitting devices, the apparatus comprising:

a rectifier converting an alternating current (AC) signal into a ripple signal by rectifying the AC signal;

a ripple signal adjuster reducing a level difference between maximum and minimum levels of the ripple signal, and outputting the resultant ripple signal as a drive signal; and a turning-on controller controlling turning-on of the light emitting devices in accordance with a level variation of the drive signal, wherein the plurality of light emitting devices are connected in series, wherein the light emitting unit comprises a plurality of light emitting device arrays, and connecting resistors each arranged between adjacent ones of the light emitting device arrays, wherein the plural light emitting devices connected in series are grouped into the plural light emitting device arrays, wherein the turning-on controller comprises switches each arranged between a reference potential and a node between an associated one of the connecting resistor and an associated one of the light emitting arrays, switching controller controlling opening and closing of the switches in accordance with a level of the drive signal, current limiting resistors each arranged between the switching controller and an associated one of the switches, and a voltage adjuster adjusting the level of the drive signal and supplying the level-adjusted drive signal to the switching controller, and wherein the voltage adjuster comprises a plurality of first resistors connected in series between high and low potentials of the drive signal, and a second resistor and a third capacitor connected in series between the high and low potentials of the drive signal.

2. The light emitting device control apparatus according to claim 1, wherein the ripple signal adjuster reduces the level difference of the ripple signal by 40 to 50%, and outputs the resultant ripple signal as the drive signal.

3. The light emitting device control apparatus according to claim 1, wherein the ripple signal adjuster increases the minimum level, to reduce the level difference.

4. The light emitting device control apparatus according to claim 1, wherein the ripple signal adjuster comprises a signal charging/discharging unit charging the ripple signal, discharging the charged signal when the level of the ripple signal is equal to or lower than a predetermined level, and outputting the resultant signal as the drive signal having the reduced level difference.

5. The light emitting device control apparatus according to claim 1, wherein the ripple signal adjuster comprises:
    a first diode having an anode connected to a low potential of the ripple signal;
    a first capacitor connected between a high potential of the ripple signal and a cathode of the first diode;
    a second diode having an anode connected to a cathode of the first diode;
    a charging path resistor having one side connected to a cathode of the second diode;
    a third diode having a cathode connected to the high potential of the ripple signal, and an anode connected to the other side of the charging path resistor; and
    a second capacitor connected between the other side of the charging path resistor and the low potential of the ripple signal.

6. The light emitting device control apparatus according to claim 5, wherein the rectifier comprises a full-wave diode bridge circuit for rectifying the AC signal, to convert the AC signal into the ripple signal.

7. The light emitting device control apparatus according to claim 1, wherein:
    the turning-on controller increases the number of turned-on ones of the light emitting devices in accordance with an increase in the level of the drive signal in a phase range within which the level of the drive signal increases from a low level to a high level; and
    the turning-on controller decreases the number of turned-on ones of the light emitting devices in accordance with a decrease in the level of the drive signal in a phase range within which the level of the drive signal decreases from a high level to a low level.

8. The light emitting device control apparatus according to claim 1, wherein the turning-on controller further comprises a reset unit connected between the switching controller and a node between the second resistor and the third capacitor, to reset operation of the switching controller upon cutting-off of supplying the AC signal or inputting of supplying the AC signal.

9. The light emitting device control apparatus according to claim 1, wherein the turning-on controller further comprises a clock generator supplying a clock signal to the switching controller.

10. The light emitting device control apparatus according to claim 9, wherein:
    the turning-on controller further comprises a counter counting the number of clocks generated in the clock generator; and
    the switching controller controls opening or closing of the switches in response to counted results from the counter.

11. The light emitting device control apparatus according to claim 1, further comprising:
    a fuse arranged between the AC signal and the rectifier.

12. The light emitting device control apparatus according to claim 1, wherein the turning-on controller sequentially turns on or off the plural light emitting devices in accordance with the level variation of the drive signal.

13. The light emitting device control apparatus according to claim 12, wherein the turning-on controller controls turning-on or turning-off of the plural light emitting devices according to the level variation of the drive signal on a per light emitting device array basis.

14. The light emitting device control apparatus according to claim 13, wherein the turning-on controller sequentially turns on the plural light emitting device arrays in accordance with the level variation of the drive signal.

15. The light emitting device control apparatus according to claim 13, wherein the turning-on controller sequentially turns off the plural light emitting device arrays in accordance with the level variation of the drive signal.

16. A light emitting device control apparatus for controlling a light emitting unit including a plurality of light emitting devices, the apparatus comprising:
    a rectifier converting an alternating current (AC) voltage into a ripple voltage by rectifying the AC voltage;
    a ripple signal adjuster increasing a minimum level of the ripple voltage, to reduce a level difference between maximum and minimum levels of the ripple voltage, thereby outputting a drive voltage having a reduced level difference; and
    a turning-on controller controlling turning-on or turning-off of the light emitting devices in accordance with a level variation of the drive voltage,
    wherein the plurality of light emitting devices are connected in series,
    wherein the light emitting unit comprises a plurality of light emitting device arrays, and connecting resistors each arranged between adjacent ones of the light emitting device arrays,
    wherein the plural light emitting devices connected in series are grouped into the plural light emitting device arrays,
    wherein the turning-on controller comprises switches each arranged between a reference potential and a node between an associated one of the connecting resistor and an associated one of the light emitting arrays, switching controller controlling opening and closing of the switches in accordance with a level of the drive signal, current limiting resistors each arranged between the switching controller and an associated one of the switches, and a voltage adjuster adjusting the level of the drive signal and supplying the level-adjusted drive signal to the switching controller, and
    wherein the voltage adjuster comprises a plurality of first resistors connected in series between high and low potentials of the drive signal, and a second resistor and a third capacitor connected in series between the high and low potentials of the drive signal.

17. The light emitting device control apparatus according to claim 16, wherein the ripple signal adjuster reduces the level difference of the ripple signal by 40 to 50%, and outputs the resultant ripple signal as the drive signal.

18. The light emitting device control apparatus according to claim 17, wherein the ripple signal adjuster increases the minimum level, to reduce the level difference.

19. The light emitting device control apparatus according to claim 17, wherein the ripple signal adjuster comprises a signal charging/discharging unit charging the ripple signal, discharging the charged signal when the level of the ripple signal is equal to or lower than a predetermined level, and outputting the resultant signal as the drive signal having the reduced level difference.

20. The light emitting device control apparatus according to claim 17, wherein the ripple signal adjuster comprises:
- a first diode having an anode connected to a low potential of the ripple signal;
- a first capacitor connected between a high potential of the ripple signal and a cathode of the first diode;
- a second diode having an anode connected to a cathode of the first diode;
- a charging path resistor having one side connected to a cathode of the second diode;
- a third diode having a cathode connected to the high potential of the ripple signal, and an anode connected to the other side of the charging path resistor; and
- a second capacitor connected between the other side of the charging path resistor and the low potential of the ripple signal.

* * * * *